April 16, 1968  H. B. HOLTON  3,378,792

TEMPERATURE STABLE ELASTIC WAVE DELAY DEVICE

Filed March 22, 1965  2 Sheets-Sheet 1

INVENTOR
H. B. HOLTON
BY
Ray M. Porter Jr.
ATTORNEY

April 16, 1968  H. B. HOLTON  3,378,792
TEMPERATURE STABLE ELASTIC WAVE DELAY DEVICE
Filed March 22, 1965  2 Sheets-Sheet 2

United States Patent Office 3,378,792
Patented Apr. 16, 1968

3,378,792
TEMPERATURE STABLE ELASTIC WAVE DELAY DEVICE
Harold B. Holton, Winston-Salem, N.C., assignor to Bell Telephone Laboratories, Incorporated, New York, N.Y., a corporation of New York
Filed Mar. 22, 1965, Ser. No. 441,798
6 Claims. (Cl. 333—30)

ABSTRACT OF THE DISCLOSURE

A temperature stabilized elastic wave delay line in which the complementing delay versus temperature characteristics of the longitudinal and the shear modes, respectively, in certain flint glasses are used by launching one of the modes, converting it into the other by reflection at a critical angle from a boundary of the medium and receiving the converted mode after a distance selected so that the sum of successive delays in each mode equals the desired delay over a broad range of temperatures.

This invention relates to temperature stabilized elastic wave delay devices and more particularly to a delay line in which the complementary delay versus temperature characteristics of two different modes of propagation in a given medium are used to neutralize temperature variations of one by the other.

The elastic wave transmission art has long been concerned with the problems caused by temperature variation. Extensive efforts have been made to develop materials having low temperature coefficients of delay, but despite these efforts, many applications still require the operation of the delay device in a temperature controlled compartment.

It is therefore an object of the invention to reduce the variation of delay with temperature in a solid body delay medium.

In accordance with the invention, it has been recognized that certain solid materials, including a class of optical glasses having low values of Poisson's ratio, have delay versus temperature coefficients for the longitudinal and shear modes of elastic wave propagation therein that are of opposite sign. Novel use is therefore made of a known principle, efficiently available only in materials of low Poisson's ratio, to convert one of these modes into the other by reflection at a critical angle from a boundary of the medium. The physical shape and dimensions of the medium are such that the path length traveled by one mode bears the proper ratio to the path length traveled after conversion by the other mode in order to cause the respective delay versus temperature characteristics to compensate each other in the desired degree. The resulting structure is rugged, compact and reliable, and can be readily adjusted at will to obtain not only a substantially flat delay versus temperature characteristic, but alternatively, a characteristic that varies according to other desired functions.

It is therefore a further object of the invention to alter or control the delay versus temperature characteristic of an ultrasonic delay line for the purpose of providing a desired characteristic for a given application or for matching, complementing, or equalizing the characteristics of other components in an associated system.

Figure 1:
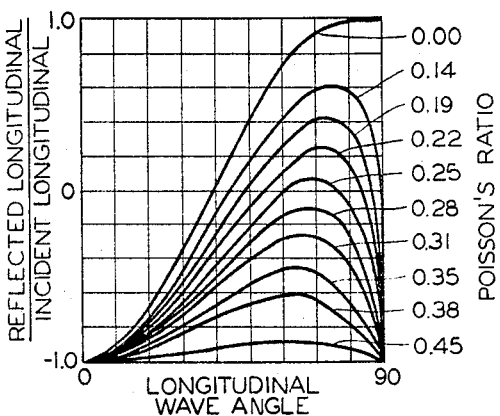
Figure 2:
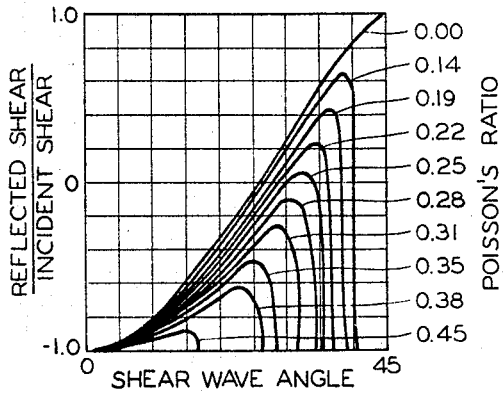
Figure 5:
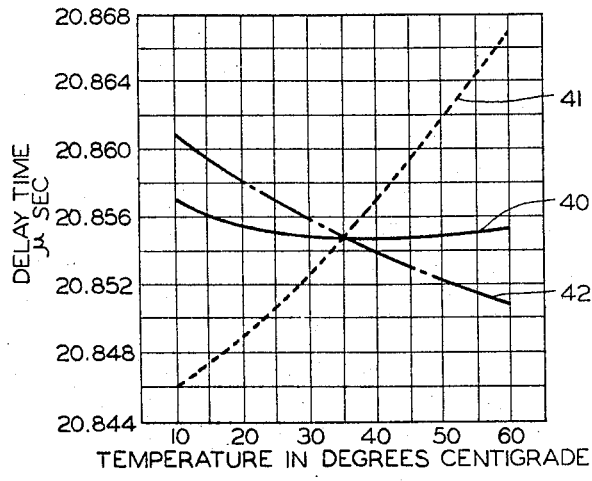
Figure 3:
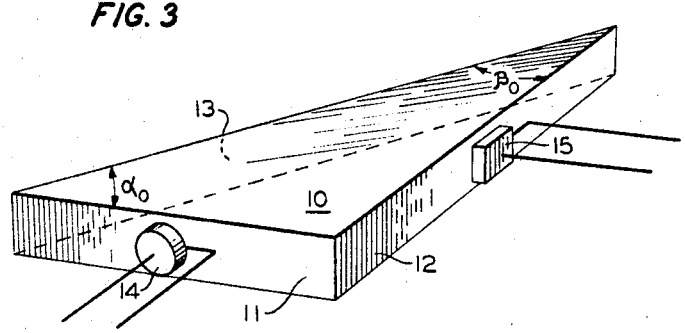
Figure 4:
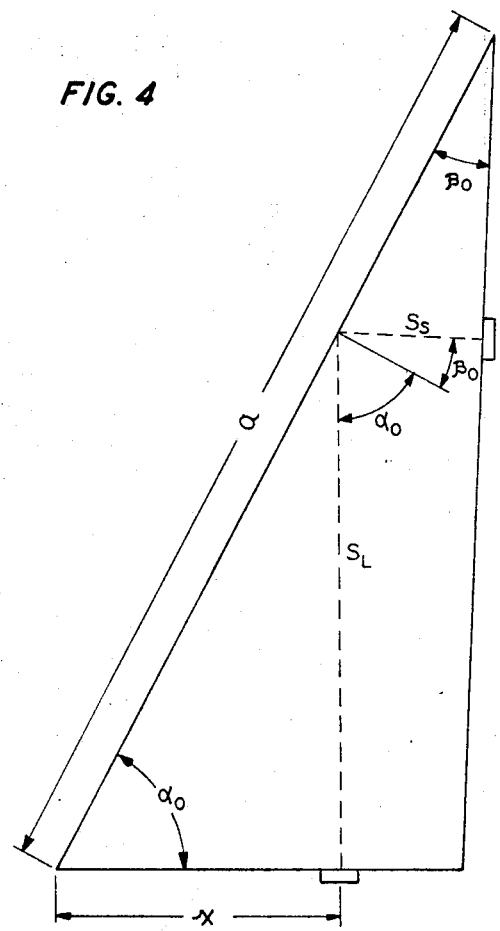

These and other objects, features and advantages, and the nature of the present invention will appear more fully upon consideration of the specific illustrative embodiment shown in the accompanying drawings and described in detail in the following explanation of these drawings in which:

FIGS. 1 and 2, given for the purposes of explanation, are characteristic curves representing the reflection coefficients involved in mode conversion by reflection at an interface as a function of the angle of incidence and Poisson's ratio;

FIG. 3 is a perspective view of an illustrative embodiment of the invention;

FIG. 4, given for the purposes of explanation, is a schematic plan view of the structure of FIG. 3 showing its various dimensions; and FIG. 5 is a plot, given for comparison, of the delay versus temperature characteristics of a shear mode, a longitudinal mode, and a combined mode in accordance with the invention.

Since the present invention takes unique advantage of the mode conversion phenomenon that occurs when an elastic wave vibration is reflected at a proper interface, this phenomenon will be examined before proceeding with a detailed analysis of the invention. Of interest here are those modes of vibration conventionally designated the "longitudinal mode" which has a particle displacement parallel to its direction of propagation and the "shear mode" which has a particle displacement perpendicular to its direction of propagation.

In general, when an elastic wave vibrating in the longitudinal mode is reflected at a solid-air (or vacuum) interface there results not only the reflected components of the original longitudinal mode propagating at an angle equal to the angle of incidence with the normal, but also a shear mode of vibration at some other angle. The converse is true if a shear mode is initially applied. Furthermore, if the medium has a Poisson's ratio less than 0.26, there will be one or two critical angles of incidence at which an incident wave of one form is completely converted into a reflected wave of the other form.

The mathematical relationships underlying this phenomenon have been worked out in detail by D. L. Arenberg in an article, "Ultrasonic Solid Delay Lines," in the Journal of the Acoustical Society of America, vol. 20, pages 1 through 26, January 1948. These relationships have been subsequently verified and refined by others. As is often the case in the elastic wave art, the resulting equations are complicated, and no useful purpose would be served by repeating them here. Their solutions, however, can be presented graphically in a very convenient and explicit form, and this is done in FIGS. 1 and 2 hereof. Thus, in FIG. 1 the ratio of the amplitudes of the reflected longitudinal wave to the incident longitudinal wave versus the angle of incidence is plotted for different values of Poisson's ratio. The angle or angles at which any one of these curves crosses the zero abscissa represent the conditions for complete conversion in terms of the longitudinal wave; i.e., there is no reflected longitudinal wave component. These particular angle values for a given Poisson's ratio are therefore referred to hereinafter and specifically defined for the purpose of the appended claims as "critical conversion angles" for the longitudinal wave. FIG. 2 shows the corresponding curves for the shear wave and the particular angle values thereof are referred to hereinafter and specifically defined for the purpose of the appended claims as "critical conversion angles" for shear waves.

To illustrate the use of these curves, assume that a typical elastic wave transmission medium has a Poisson's ratio in the order of 0.22. Therefore a longitudinal wave directed at a mode converting interface at an angle taken from FIG. 1 of 54.5° will be substantially completely converted into a shear wave at an angle taken from FIG. 2 in the order of 29°. At angles different from the critical angle conversion still takes place but with less efficiency. The converse relationship, of course, applies with the same angles being associated with the same vibration modes.

With this background in mind, the principles of the invention may now be considered in connection with the illustrative embodiment shown in perspective in FIG. 3 and in schematic in FIG. 4. Thus, the delay medium comprises a flattened, basically wedge shaped block 10 of a suitable elastic wave propagation material having a Poisson's ratio of less than 0.26 and in addition having a shear wave temperature coefficient of delay of opposite sign to its longitudinal wave temperature coefficient of delay. Temperature coefficients of opposite sign implies that in the material the shear wave delay varies monotonically with temperature in one direction while the longitudinal wave delay varies monotonically with temperature in the other. These properties are found in a class of optical grade flint glasses. One particularly suitable material is the commercially available, extra density, flint glass produced by the Bausch and Lomb Company and designated by the manufacturer as EDF-1.

Block 10 has top and bottom plane surfaces that are substantially parallel and are spaced apart by a distance of several wave lengths of the elastic wave energy so that the surfaces do not materially interfere with propagation of the desired mode. The front and right-hand plane faces 11 and 12, respectively, are oblique to each other and form acute angles $\alpha_0$ and $\beta_0$, respectively, with the third plane face 13. The angles $\alpha_0$ and $\beta_0$ are specific critical conversion angles as defined in connection with FIGS. 1 and 2. Other dimensions of block 10 are shown on FIG. 4 and will be discussed hereinafter.

A transducer 14 is provided upon the front face 11 for coupling an electrical signal to and from an elastic wave vibration in block 10 in the longitudinal mode. This transducer may be a conventional crystal or ceramic piezoelectric member, poled in a direction perpendicular to surface 11, provided with appropriate electrodes which drive the member parallel to its poling and which is then bonded to surface 11 at a point to be defined hereinafter.

A transducer 15 is provided on surface 12 for coupling an electrical signal to and from an elastic wave vibration in block 10 in the thickness shear mode which has a particle displacement parallel to the top and bottom surfaces of block 10 as well as perpendicular to the direction of propagation. Transducer 15 may be a conventional crystal or ceramic piezoelectric member, poled in a direction parallel to surface 12, provided with appropriate electrodes which drive it perpendicular to its poling, and then bonded to surface 12 with the poling direction parallel to surface 12 and to the top and bottom surfaces of block 10.

In operation an electrical signal is applied to the driving electrodes of one of the transducers, for example, transducer 14. Transducer 14 converts the signal into a longitudinal elastic wave traveling away from face 11 within block 10 in a direction that is normal to this face and angularly related to face 13. Since the angle $\alpha_0$ represents the critical conversion angle of incidence for the longitudinal mode, energy is converted at face 13 into the shear mode traveling away from face 13 with a reflection angle $\beta_0$ in a direction normal to face 12. When transducer 15 is properly positioned on face 12, it receives the shear mode and reconverts its energy into electrical vibrations. The time at which this occurs is precisely delayed from the initiating time by the sum of the delay introduced along the longitudinal mode path and the delay introduced along the shear mode path. Furthermore, since the delay along one path varies with temperature in the opposite direction to the delay along the other path, proper control of their ratios can minimize variations of total delay with temperature.

Design of a given delay medium to produce a desired total delay together with the desired temperature compensation can be seen to involve the proper simultaneous selection of the sum of the individual longitudinal and shear mode path lengths, the proper ratio between them and the proper angles of incidence and reflection at face 13 in terms of the physical geometry of the structure as defined by the particular angles and dimensions shown in FIG. 4. Thus, referring to FIG. 4 assume that the dimension $a$ and the angles $\alpha_0$ and $\beta_0$ of body 10 have been measured at some convenient temperature $T_0$. Over the path length $S_L$ the wave travels as a longitudinal wave at a velocity $V_L$, and over the path length $S_S$ the wave travels as a shear wave at a velocity $V_S$. Furthermore, in traveling over the path length $S_L$ the longitudinal wave is delayed for a time interval $D_L$, and in traveling over the path length $S_S$ the shear wave is delayed for a time interval $D_S$. Since the material selected for body 10 exhibits delay characteristics $D_L(T)$ and $D_S(T)$ which undergo opposing variations over a temperature range R, such that as the temperature varies one of the delay times increases while the other decreases, there is a compensating effect which tends to reduce the overall variation of delay with temperature.

In order to illustrate how temperature compensation can be achieved, suppose that a total delay time $D_T$ is required at the temperature $T_0$, and that an average temperature coefficient of delay of $K_X$ is desired over the temperatures range R which spans $\Delta T$ degrees. Assume that the material selected for body 10 has average temperature coefficients of delay of $K_L$ and $K_S$ for longitudinal waves and shear waves, respectively, over the range R. To provide the required total delay, the delay time $D_L$ of the longitudinal wave and the delay time $D_S$ of the shear wave must when added equal $D_T$.

$$D_T = D_L + D_S \tag{1}$$

When the temperature changes by an amount $\Delta T$ the longitudinal wave delay $D_L$ will change by an amount $\Delta D_L$ and the shear wave delay $D_S$ will change by an amount $\Delta D_S$. These changes will add to produce a total delay change $\Delta D_T$ which is given by, $$\Delta D_T = \Delta D_L + \Delta D_S$$

$$K_X \Delta T D_T = K_L \Delta T D_L + K_S \Delta T D_S \tag{2}$$

The simultaneous solution of Equations 1 and 2 determines the delay times which are required in each mode of propagation to achieve the desired result:

$$D_L = \frac{D_T(K_S - K_X)}{(K_S - K_L)} \tag{3}$$

and $$D_S = \frac{D_T(K_X - K_L)}{(K_S - K_L)} \tag{4}$$

Therefore, the proper ratio of delay times required to achieve the desired temperature compensation is, $$\left(\frac{D_L}{D_S}\right) = \left(\frac{K_S - K_X}{K_X - K_L}\right) \tag{5}$$

and the corresponding path length ratio is, $$\left(\frac{S_L}{S_S}\right) = \left(\frac{V_L}{V_S}\right)\left(\frac{K_S - K_X}{K_X - K_L}\right). \tag{6}$$

Thus, an optimum position X for the transducer 14 can be determined from the geometry of body 10 as shown in FIG. 4, by substituting the proper path length ratio $$\left(\frac{S_L}{S_S}\right)$$

into the following equation:

$$X = \left[\frac{a\left(\frac{S_L}{S_S}\right)\sin \beta_0}{\tan \alpha_0 + \left(\frac{S_L}{S_S}\right)\left(\frac{\sin \beta_0}{\cos \alpha_0}\right)}\right]. \tag{7}$$

The desired temperature compensation will be achieved when the transducer 14 is positioned on face 11 at a distance X from the intersection of faces 11 and 13, recognizing of course that the transducer 15 must also be in the proper position on face 12 for receiving the reflected shear wave.

It is often desirable to minimize the variation of delay with temperature. In this case $K_X=0$ and Equation 6 reduces to:

$$\left(\frac{S_L}{S_S}\right)=-\left(\frac{V_L}{V_S}\right)\left(\frac{K_S}{K_L}\right) \qquad (8)$$

A specific embodiment of the invention which has been reduced to practice included the following dimensions and parameters as set forth in the foregoing equations:
Delay medium: Bausch and Lomb EDF-1 Glass Dimensions:
 $a=4.128$ inches
 $\alpha_0=54°28'24''$
 $\beta_0=28°55'52''$
 $(S_L/S_S)=3.405$
 $X=1.607$
Parameters:
 Poisson's ratio$=0.22$
 $K_L=-9.2$ p.p.m./° C.
 $K_S=18.8$ p.p.m./° C.
 $(V_S/V_L)=0.6$
Composition-mole percent:
 $SiO_2=69.0$
 $K_2O=7.37$
 $PbO=21.5$
 $TiO=1.8$
 $As_2O_3=0.13$
 $ZrO_2=0.20$ Measurements made at 15 mc./sec. over a variation in temperature from 10 to 60 degrees centigrade produced the characteristics shown by curve 40 on FIG. 5. Thus, the combined shear and longitudinal mode path, in accordance with the invention, has an average temperature coefficient of delay of only $-1.2$ parts per million per degree centigrade. For comparison, curves 41 and 42 on FIG. 5 show the variation of uncompensated shear and longitudinal waves respectively, propagating through the same material but along path lengths which have been adjusted so that the delay times are comparable over the temperature range and are equal at 35 degrees centigrade The uncompensated shear wave has an average temperature coefficient of 18.8 parts per million per degree centigrade and the uncompensated longitudinal wave has an average temperature coefficient of $-9.2$ parts per million per degree centigrade. This comparison shows the improvement obtained by the compensating effect of the combination of two oppositely varying characteristics, in accordance with the invention.

While primary emphasis has been placed herein on obtaining a relatively flat coefficient of delay versus temperature, it should be understood that the principles of the invention can find usefulness in other applications. Note from the foregoing equations that the parameter X, which determines the location of the transducers, is the only parameter necessary to be varied in order to change the ratio of longitudinal to shear mode path lengths and the resulting temperature characteristic. The invention may therefore be used to equalize the temperature coefficient of delay through any system that includes a delay device in accordance with the invention as one component thereof. Furthermore, changes in the characteristics of any component, due to aging, for example, may be readily compensated for from time to time merely by repositioning the transducers to accommodate a new value of X.

Furthermore, while the invention has been described in terms of a double ended delay line with separate input and output transducers, it should be understood that single ended operation is also possible. Thus, only a single transducer would be employed to launch a wave at one of the surfaces 11 in a first mode, either shear at surface 12 or longitudinal at surface 11, which would undergo reflection at face 13 and conversion into a second mode. The second mode would be reflected at the other face, reconverted into the first mode at surface 13 and received by the transducer at the original face.

In all cases, it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. An elastic wave delay device comprising a body of elastic wave transmission material having at least one plane face, means for launching an elastic wave in a first mode of vibration within said body directed upon said face at substantially the critical conversion angle for which said first mode is converted upon reflection from said face into a second and different mode of vibration, and means for receiving elastic wave energy from said body after it has traveled therein in both said first and second modes for distances $S_L$ and $S_S$ respectively according to the ratio $$\left(\frac{S_L}{S_S}\right)=-\left(\frac{V_L}{V_S}\right)\left(\frac{K_S}{K_L}\right)$$

where $V_L$ and $V_S$ are the propagation velocities respectively of said first and second modes and $K_L$ and $K_S$ are the delay versus temperature coefficients respectively of said first and second modes.

2. An elastic wave delay device comprising a body having at least one plane face and being formed from an elastic wave transmission material having delay versus temperature coefficients of opposite sign for first and second different modes of vibration, means for launching a wave in said first mode of vibration within said body directed upon said face at substantially the critical conversion angle for which said first mode is converted upon reflection from said face into said second mode, and means for receiving said second mode reflected from said face.

3. An elastic wave delay device comprising a body of flint glass for supporting elastic wave transmission and having at least one plane face, means for launching an elastic wave in a first mode of vibration within said body directed upon said face at substantially the critical conversion angle for which said first mode is converted upon reflection from said face into a second and different mode of vibration, and means for receiving said second mode, said means for receiving being spaced from said face by a distance related to the distance between said means for launching and said face such that the elastic wave transmission characteristic along the sum of said distances is different from the corresponding characteristics along either distance alone.

4. An elastic wave delay device comprising a body of elastic wave transmission material having at least one plane face, means for launching an elastic wave in a first mode of vibration within said body that has therein a delay versus temperature coefficient of one sign, said wave being directed upon said face at substantially the critical conversion angle for which said first mode is converted upon reflection from said face into a second mode of vibration that has therein a delay versus temperature coefficient of a sign oposite to said one sign, and means for receiving elastic wave energy that has traveled from said face by a path distance that causes said coefficient of said one sign to compensate said coefficient of said opposite sign.

5. An elastic wave delay device comprising a body having at least three triangularly related faces in which first and second of said faces each make acute angles with the third of said faces and being formed from an elastic wave transmission material having delay versus temperature coefficients of opposite sign for shear and longitudinal modes of elastic wave vibration therein, means upon said first face for coupling to and from said shear mode, and means upon said second face for coupling to and from said longitudinal mode, said acute angles being predetermined critical conversion angles for which elastic waves incident upon said third face are converted to and from said shear and longitudinal modes.

6. An elastic wave delay device comprising a body of elastic wave transmission material having a Poisson's ratio of less than 0.26 and having at least three triangularly related faces in which first and second of said faces each make acute angles with the third of said faces, means upon said first face for coupling to and from the shear mode of elastic wave vibration in said body, and means upon said second face for coupling to and from the longitudinal mode of elastic wave vibration in said body, said acute angles being predetermined critical conversion angles for which elastic waves incident upon said third face are converted to and from said shear and longitudinal modes, the respective distances of propagation of said shear and longitudinal modes being predetermined so that their respective delay versus temperature characteristics tend to compensate.

References Cited
UNITED STATES PATENTS

| | | | |
|---|---|---|---|
| 2,624,804 | 1/1953 | Areberg | 333—30 |
| 2,957,142 | 10/1960 | May | 333—30 |

ROY LAKE, *Primary Examiner.*

DARWIN R. HOSTETTER, *Examiner.*